United States Patent [19]
Corrigan

[11] 4,146,053
[45] Mar. 27, 1979

[54] FILL AND VENT VALVE ASSEMBLY
[75] Inventor: Ara L. Corrigan, Davenport, Iowa
[73] Assignee: Caterpillar Tractor Co., Peoria, Ill.
[21] Appl. No.: 820,173
[22] Filed: Jul. 29, 1977
[51] Int. Cl.² ............... B15B 13/04; B62D 55/18; F16K 11/10
[52] U.S. Cl. .................. 137/588; 137/596; 137/625.18; 91/449; 305/10
[58] Field of Search ............ 137/588, 596, 625.18, 137/614.17, 321; 91/449, 432; 305/10

[56] References Cited
U.S. PATENT DOCUMENTS

| | | | |
|---|---|---|---|
| 3,924,904 | 12/1975 | Wagner et al. | 91/449 X |
| 3,963,047 | 6/1976 | Moring | 137/596 |

Primary Examiner—William R. Cline
Attorney, Agent, or Firm—John W. Grant

[57] ABSTRACT

A fill and vent valve assembly has a bore in a first member and a cylindrical stem of a second member positioned within the bore. A blind bore extends inwardly from an inner end of the stem and has an internal threaded section. First and second passages in the stem communicate the blind bore with a passage device which communicates the bore of the first member with a fluid chamber. A fill valve has an external threaded section threaded into the internal threaded section of the stem and is movable between a first position at which a valve seat of the valve is in sealing engagement with the inner end of the stem and the first and second passages are blocked from communication with ambient and a second position at which the valve seat is spaced from the inner end and the second passage is in communication with ambient for purging air from the fluid chamber in response to fluid being forced through the fill valve and into the fluid chamber through the first passage.

9 Claims, 3 Drawing Figures

U.S. Patent  Mar. 27, 1979  4,146,053
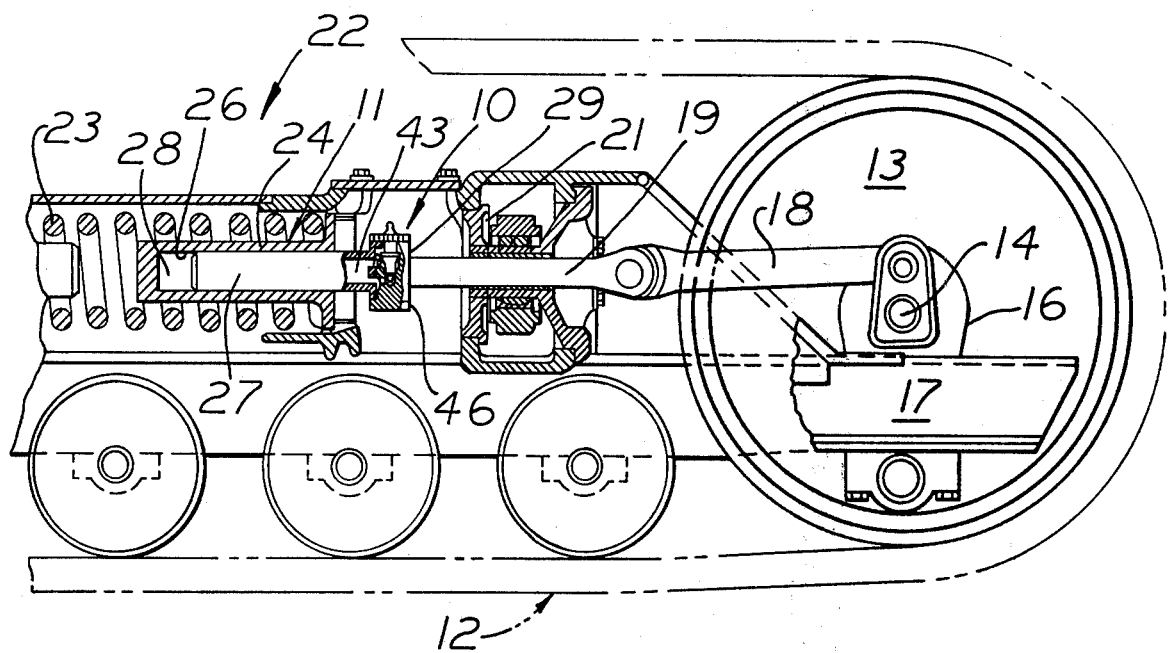
Fig_1_
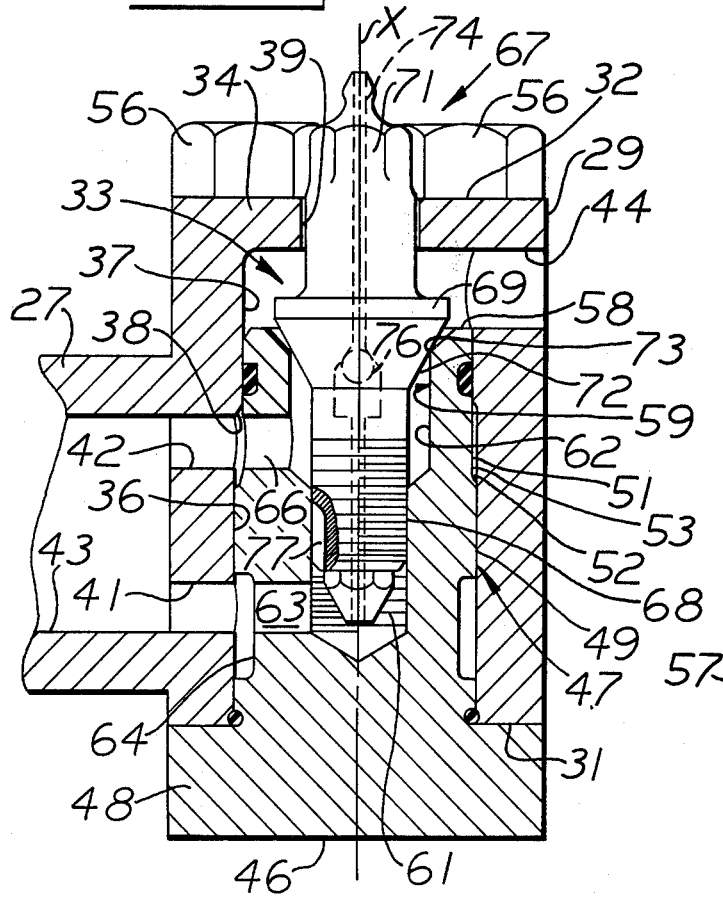
Fig_2_
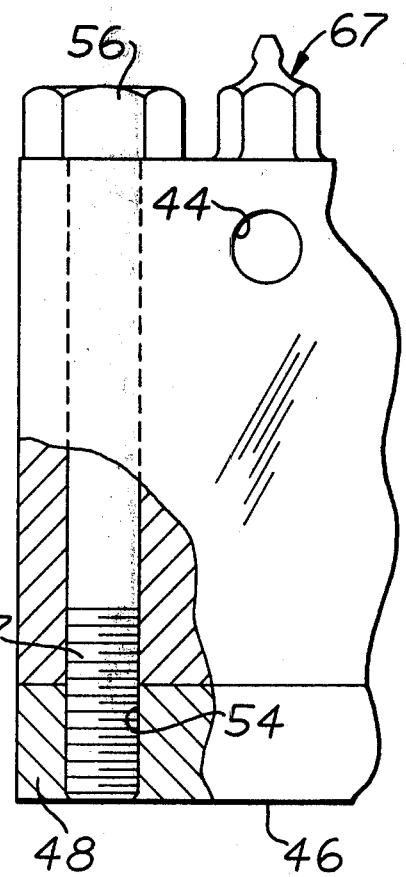
Fig_3_

FILL AND VENT VALVE ASSEMBLY

BACKGROUND OF THE INVENTION

Hydraulic track adjusters used on crawler tractors between the recoil spring and the idler commonly have a variable volume fluid chamber into which grease or oil is added to extend a rod or piston for tightening the track chain to compensate for wear to the track components. Many of such track adjusters include a fill valve for adding pressurized fluid to the chamber and a separate relief valve for venting the chamber in preparation for disassembling the track chain. During initial filling of the fluid chamber, the relief valve is normally open slightly to purge trapped air from the chamber as fluid is pumped into the chamber through the fill valve.

Another type of track adjuster uses a single fill valve which also functions as a vent valve for venting the chamber prior to disassembly of the recoil mechanism or for relieving the tension on the tracks for adjustment. One of the problems encountered with track adjusters having only a single fill valve is that of purging the air from the adjusting chamber during the initial filling of the chamber particularly when the recoil mechanism is in place on the tractor. Proper operation of the recoil mechanism is dependent upon the adjusting chamber not having any air trapped therein. If air is trapped within the adjusting cylinder, the track adjuster is spongy and proper track adjustment cannot be maintained.

SUMMARY OF THE INVENTION

The present invention is directed to overcoming one or more of the problems as set forth above.

According to the present invention a fill and vent valve assembly for the introduction of fluid into and the selective venting of fluid from a fluid chamber includes a first member having a bore and passage means connecting the bore with said chamber. A second member has a cylindrical stem having a longitudinal axis and being positioned within the bore. The stem has an inner end, a blind bore, and first and second passages. The blind bore extends inwardly from the inner end along the longitudinal axis and has an internal threaded section. The first and second passages connect the blind bore with the passage means and are longitudinally spaced one from the other. A fill valve has an external threaded portion and a valve seat. The external theaded portion is threaded into the internal threaded section of the second member. The fill valve is selectively movable between a first position at which the valve seat is in sealing engagement with the inner end of the stem and the first and second passages are blocked from communication with ambient and a second position at which the valve seat is spaced from the inner end and the second passage is in communication with ambient for purging air from the fluid chamber in response to fluid being forced through the fill valve and into the chamber through the first passage.

BRIEF DESCRIPTION OF THE DRAWINGS

FIG. 1 is a diagrammatic view in partial section of a track assembly having the apparatus of this invention;

FIG. 2 is an enlarged sectional view of the fill and vent valve assembly of this invention; and FIG. 3 is a partial front view of the fill and vent valve of FIG. 2.

DETAILED DESCRIPTION

Referring to FIG. 1 of the drawings, a fill and vent valve assembly is generally indicated at 10 in association with a hydraulic track adjuster 11 of a crawler track assembly 12. The track assembly has an idler 13 rotatably mounted on a shaft 14, the ends of which are secured to a pair of brackets, one shown at 16, slidably mounted on the forward end of a track roller frame 17. A yoke 18 is secured to the brackets and has a rearwardly extending recoil rod 19 slidably mounted in a support 21 connected to the roller frame rearwardly of the idler. A recoil mechanism 22 is mounted on the track roller frame rearwardly of the support 21 in the usual manner and has a recoil spring 23 and a spring seat 24.

The spring seat 24 also forms a part of the hydraulic track adjuster 11 and has a blind bore 26 therein opening toward the support 21. An elongate cylindrical tubular piston 27 is slidably positioned within the bore 26 in telescopic fashion creating a variable volume fluid chamber 28. A first member or body 29 is secured to the forward end of the tubular piston 27 such as by welding or the like.

Referring to FIG. 2, the first member 29 has first and second ends 31, 32 and a stepped bore 33 extending inwardly from the first end forming an end wall 34 at the second end. The bore has first and second concentric bore portions 36, 37 forming an annular shoulder 38 therebetween. An opening 39 extends through the end wall and is concentric with the stepped bore. A passage means, for example passages 41, 42, communicates the first bore portion with the fluid chamber 28 by way of a central passage 43 in the tubular piston 27. A vent passage 44 communicates the second bore portion with ambient.

A second member 46 has a cylindrical stem 47 extending upwardly from a flange 48. The stem is positioned within the stepped bore 33 of the first member 29 and has a longitudinal axis "X" positioned coaxial with a longitudinal axis of the stepped bore. The stem has a first cylindrical portion 49 positioned within the first bore portion 36 and a second reduced diameter cylindrical portion 51 positioned within the second bore portion 37. The reduced diameter portion 51 terminates at a shoulder or reaction surface 52. The shoulders 38, 52 and portions of the first bore portion 36 and the first cylindrical portion 49 define an annular chamber 53 which is in communication with the passage 42.

The flange 48 has a plurality of threaded holes, one shown at 54. The flange is seated against the first end 31 of the first member 29 and is connected thereto by a plurality of bolts 56 each of which has a threaded portion 57 threaded into the threaded holes 54. The stem 47 has an inner end 58 and a blind stepped bore 59 extending inwardly from the inner end. The blind bore has an internal threaded section 61 at the blind end and a smooth bore section 62 at the inner end. A first passage 63 connects the inner end of the threaded bore section with an annular groove 64 in the first cylindrical portion 49 of the stem 47. The annular groove is in communication with the passage 41. A second passage 66 connects the smooth bore section 62 with the annular chamber 53.

A fill valve 67 has an external threaded portion 68 on one end threaded into the internal threaded section 61 of the second member 46 and an enlarged valve seat 69 intermediate the threaded portion and a tool receiving portion 71 on the other end. The valve seat has a conical surface 72 positioned for seating engagement with a circular edge 73. The fill valve is movable between a first position at which the conical surface 72 of the valve seat 69 is in sealing engagement with the circular edge 73 of the inner end 58 of the stem 47 and the first and second passages 63, 66 are blocked from communication with ambient and a second position at which the conical surface 72 is spaced from the circular edge 73 and the second passage is in communication with ambient for purging air from the fluid chamber 28 in response to fluid being forced through the fill valve and into the fluid chamber through the first passage 63.

A passageway 74 extends axially through the fill valve 67 for transmitting fluid therethrough and has a check valve 76 for permitting one-way communication of fluid therethrough in a direction for introducing fluid into the fluid chamber 28. In the assembled position shown, the tool receiving portion 71 extends through the opening 39 in the end wall 34 and the enlarged valve seat 69 is confined between the end wall and the inner end 58 of the stem 47. A slot 77 in the threaded portion 68 communicates the first passage 63 with vent passage 44 at the second position of the fill valve.

The length of the annular groove 64 and the length of the threaded engagement between the threaded portion 57 of the bolts 56 and the threaded holes 54 in the flange 48 is selected so that as the bolts are being unscrewed from the threaded holes and the flange 48 separates from the first end 31 of the first member 29, the annular groove 64 communicates the passage 41 and hence the fluid chamber 28 with ambient before the threaded portions of the bolts become disengaged from the threaded holes.

In the use of the fill and vent valve assembly 10, to initially fill the fluid chamber 28, the fill valve 67 is moved to its second position. Thus, fluid can be forced through the passageway 74 of the fill valve, through passages 63 and 41, central passage 43 of piston 27 and into fluid chamber 28. The fluid entering the fluid chamber forces air outwardly through passages 42, 66, between the conical surface 72 and circular edge 73 and is vented to ambient through the vent passage 44. When the fluid chamber and central passage become filled with fluid and all the air purged from the fluid chamber and central passage, fluid will then start to pass through the passages 42, 66 and be expelled through the vent passage 44. At this time, the fill valve 67 will be moved to its first position to block the fluid chamber and passages from ambient. Additional fluid can then be pumped into the fluid chamber for adjusting the track tension.

Prior to disassembly of the recoil mechanism 22, track adjuster 11, or the fill and vent valve assembly 10 after fluid chamber 28 has first been filled with fluid, the fluid pressure in the fluid chamber can be relieved by moving the fill valve 67 to its second position. This allows the pressurized fluid to be vented through the passages 42, 66 and 44.

Should an attempt be made to disassemble the fill and vent valve assembly 10 without first relieving the pressure in the fluid chamber 28, the fluid chamber will automatically be vented through the passage 41 and annular groove 64 before the bolts 56 become disengaged from the flange. As the bolts are being unscrewed from the flange, the fluid pressure in the annular chamber 53 reacts against the reaction surface 52 moving the second member 46 relative to the first member 29.

Other aspects, objects and advantages of this invention can be obtained from a study of the drawings, the disclosure and the appended claims.

The embodiments of the invention in which an exclusive property of privilege is claimed are defined as follows:

1. A fill and vent valve assembly for controlled introduction of fluid into and the selective venting of fluid from a fluid chamber comprising:

a first member having a bore and passage means connecting the bore with said chamber, said bore having first and second ends with said first end being open to ambient;

a second member having a cylindrical stem having a longitudinal axis and being sealingly positioned within the bore blocking the second end of the bore and said passage means from ambient, said stem having an inner end, a blind bore extending inwardly from the inner end along the longitudinal axis and opening into said first end of said bore and having an internal threaded section, and first and second passages connecting the blind bore with the passage means and being longitudinally spaced one from the other; and a fill valve having means for one way communication of fluid therethrough, an external threaded portion and a valve seat, said external threaded portion being threaded into the internal threaded section of the second member, said fill valve being selectively movable between a first position at which the valve seat is in sealing engagement with the inner end of the stem so that the blind bore and the first and second passages are blocked from communication with said first end of the bore and a second position at which the valve seat is spaced from the inner end and the first passage is blocked from said second passage by said external threaded portion so that the blind bore and the second passage is in communication with said first end of the bore for purging air from the chamber in response to fluid being forced through said means for one way communication of fluid in the fill valve and into the fluid chamber through the first passage.

2. The valve assembly of claim 1 wherein said first member has a first end, said second member has a flange seated against the first end, and including means for connecting the flange to the first member.

3. The valve assembly of claim 2 wherein said first member has a second end, an end wall at the second end, and a vent passage communicating the first end of the bore with ambient.

4. The valve assembly of claim 3 including an opening extending through the end wall concentric with the bore, and said valve seat being confined between said inner end of the stem and the end wall and having a tool receiving portion extending through said opening in the end wall.

5. The valve assembly of claim 2 wherein said means for connecting the flange to the first member includes a threaded hole in the flange and a bolt screw threaded into the threaded hole.

6. The valve assembly of claim 5 including a groove in the stem, said groove having a length and being positioned at a location sufficient for communicating the passage means with ambient before the bolt becomes disengaged from the threaded hole in the flange during disassembly of the fill and vent valve assembly.

7. The valve assembly of claim 6 including means for automatically moving the second member relative to the first member to a position at which the fluid chamber is in communication with ambient in response to the bolt being unscrewed from the threaded hole.

8. The valve assembly of claim 7 wherein said bore has first and second concentric bore portions, said stem has a first cylindrical portion positioned within the first bore portion, a second cylindrical portion positioned within the second bore portion, said means for automatically moving the second member relative to the first member including a reaction surface positioned between the first and second cylindrical portions defining an annular chamber between the second concentric bore portion and said second cylindrical portion, said annular chamber being in communication with said second passage.

9. The fill valve assembly of claim 8 wherein said passage means includes a third passage in communication with said groove and a fourth passage in communication with said annular chamber and said second passage.

* * * * *